June 17, 1924.

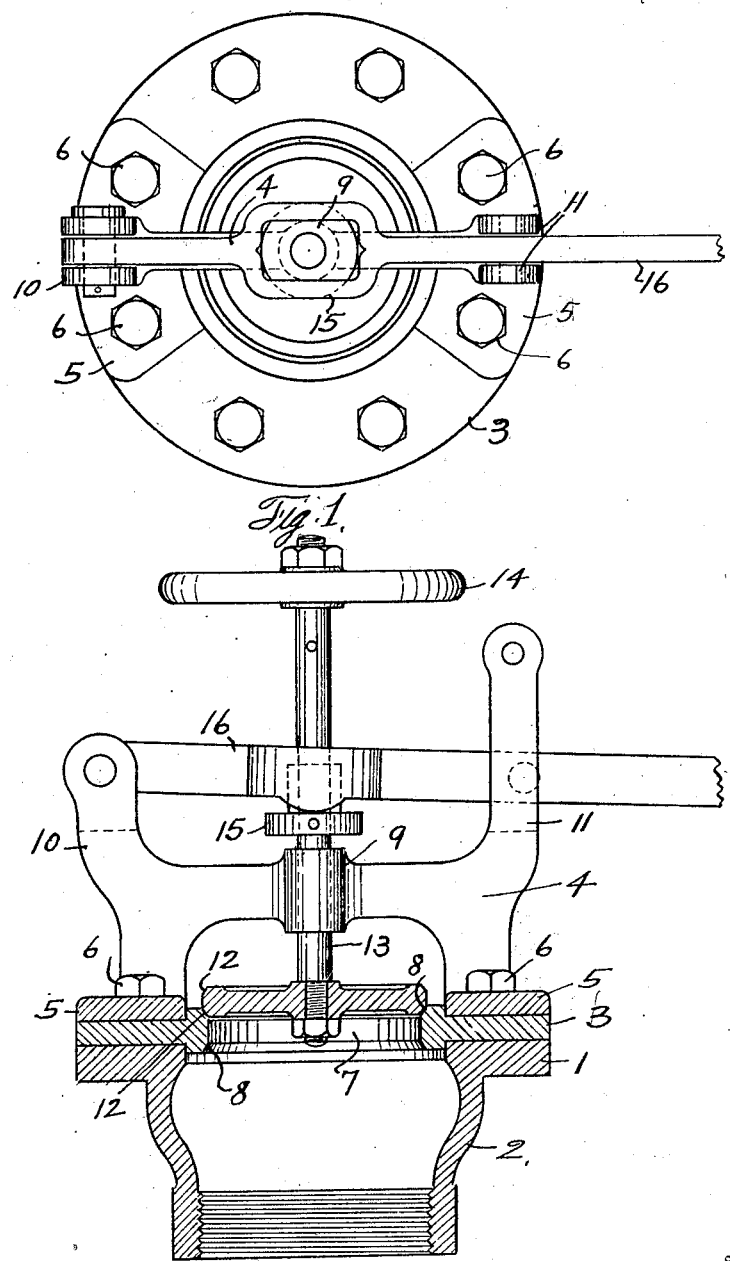

J. C. FANT

VALVE

Filed May 11, 1923

Joseph C. Fant, Inventor

By Hardwy Cathy, Attorneys

Patented June 17, 1924.

1,498,024

UNITED STATES PATENT OFFICE.

JOSEPH C. FANT, OF HOUSTON, TEXAS.

VALVE.

Application filed May 11, 1923. Serial No. 638,201.

*To all whom it may concern:*

Be it known that I, JOSEPH C. FANT, citizen of the United States, residing at Houston, in the county of Harris and State of Texas, have invented certain new and useful Improvements in Valves, of which the following is a specification.

This invention relates to new and useful improvements in valves.

One object of the invention is to provide a valve specially adapted for use on stills employed in the distillation of oils, such as petroleum, but which is also adapted for general use.

Another object of the invention is to produce a valve which may be employed either as a vacuum valve operated by suction, or as a pressure valve which is operated by pressure.

In distilling petroleum the still sometimes overflows, due to excessive ebullition, and should be equipped with a vacuum or suction valve which will automatically open and let in a sufficient amount of air to fill the vacuum thus produced. The still may also be equipped with a pressure valve which will automatically open to permit the escape of excess gases which may accumulate. The valve herein described may be used for either of said purposes.

With the above and other objects in view the invention has particular relation to certain novel features of construction, operation and arrangement of parts, an example of which is given in this specification and illustrated in the accompanying drawings, wherein:—

Figure 1 shows a plan view of the valve employed as a pressure type valve.

Figure 2 shows a sectional view thereof.

Figure 4:
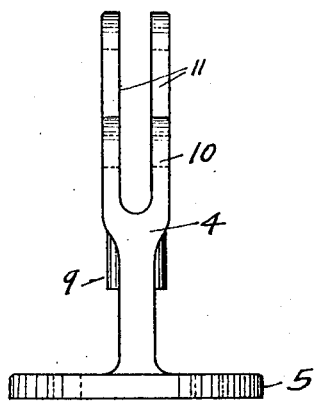
Figure 4 shows a side view of the yoke employed.

In the drawings the numeral 1 designates the annular base which has the tubular nipple 2 formed integrally therewith. The nipple is internally threaded for attachment to a suitable connection. On the base there is an annular valve seat 3 and mounted on this seat there is the yoke 4 formed with opposing arcuate feet 5, 5, said seat and yoke being secured on said base by set bolts as 6, 6. The seat has a central opening as 7 which is flared each way, forming annular beveled faces as at 8, 8. The yoke 4 is of a general U-shaped form and has a central bearing 9 and also an upstanding arm 10 at one side and an upstanding bifurcated guide 11 at the other side. There is a disc like valve head whose margin is oppositely beveled forming annular beveled faces as at 12, 12. A stem 13 works through the bearing 9 and is attached at one end to said head and at its other end has a hand wheel as 14 attached to it. The stem has an annular bearing member as 15 pinned thereon. A lever 16 is pivoted to the lever 10 and works against the upper side of said bearing member, as shown in Figures 1 and 2, when the valve is to be used as a pressure valve, as shown in said figures. In such case the inner face 12 of the head cooperates with the outer face 8 of the seat and the bearing member 15 is in lower position just above the bearing 9. The lever 16, in this form, is pivoted at one end to the arm 10 and works in the guide 11 and the valve is normally held closed by a weight, carried by, or a pull spring attached to, the free end of the arm, or by some similar well known device. Excessive pressure from beneath will lift said valve, the size of the weight, or the tension of the spring determining the pressure required.

Figure 3:
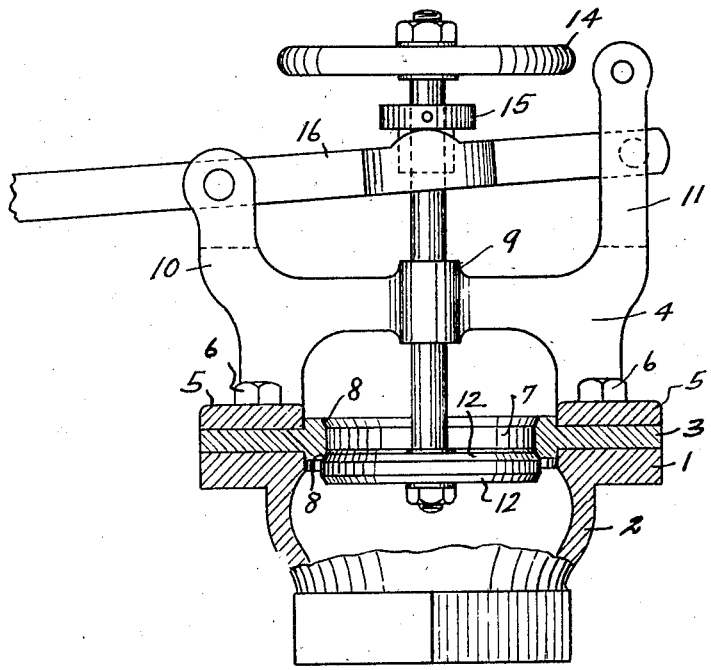
Figure 3 shows a sectional view of the suction type of valve.

When used as a suction valve the lever 16 is pivoted to the arm 10 and one end of said lever works underneath said bearing member 15 which is in upper position just beneath the hand wheel 14. The other end of the lever 16 carries a weight or has a pull spring attached thereto. In this form the outer face 12, of the head, cooperates with the inner face 8 of the seat, as shown in Figure 3, the head being located within the nipple 2.

A vacuum in the still will cause the valve to open by air pressure until the vacuum is relieved.

If, for any reason, the valve should not seat perfectly, or clogging material should become interposed between the valve head and seat, the hand wheel 14 may be grasped and turned so as to remove said offending material and cause the perfect seating of the valve.

What I claim is:—

A device of the character described including an annular base, a tubular nipple formed integrally therewith, an annular valve seat mounted on the base, a yoke mounted on the seat and formed with opposing arcuate seat, means for securing said yoke and seat on said base, said seat having a central opening flared each way forming annular beveled faces, a central bearing formed in the yoke an upstanding arm carried by one side of the yoke, and an upstanding bifurcated guide carried by the other side of the yoke, a disc like valve head whose margin is oppositely beveled forming annular beveled faces, a stem working through said bearing and attached at one end to said valve head, a hand wheel attached to the other end of said stem, a lever pivoted to said arm and working between the fingers of said guide, an annular bearing member fitted on said stem, said lever working against said bearing member to hold said valve closed.

In testimony whereof I have signed my name to this specification in the presence of two subscribing witnesses.

JOSEPH C. FANT.

Witnesses:
 WM. A. CATHEY,
 W. H. DUNLAY.